(12) United States Patent
Wong et al.

(10) Patent No.: US 7,655,084 B2
(45) Date of Patent: Feb. 2, 2010

(54) CARBON BLACK INKS AND METHOD FOR MAKING SAME

(75) Inventors: Raymond W. Wong, Mississauga (CA); Marcel P. Breton, Mississauga (CA); Christine E. Bedford, Burlington (CA); Adela Goredema, Mississauga (CA); Caroline Turek, Hamilton (CA)

(73) Assignee: Xerox Corporation, Norwalk, CT (US)

( * ) Notice: Subject to any disclaimer, the term of this patent is extended or adjusted under 35 U.S.C. 154(b) by 487 days.

(21) Appl. No.: 11/301,732

(22) Filed: Dec. 12, 2005

(65) Prior Publication Data

US 2007/0131138 A1 Jun. 14, 2007

(51) Int. Cl.
*C09D 11/00* (2006.01)

(52) U.S. Cl. .................................. 106/31.61

(58) Field of Classification Search ............... 525/285; 528/339.5; 347/347; 523/523
See application file for complete search history.

(56) References Cited

U.S. PATENT DOCUMENTS

| | | | |
|---|---|---|---|
| 3,172,892 A | 3/1965 | Le Suer et al. | |
| 3,202,678 A | 8/1965 | Stuart et al. | |
| 3,219,666 A | 11/1965 | Norman et al. | |
| 3,280,034 A | 10/1966 | Anzenberger et al. | |
| 3,361,673 A | 1/1968 | Stuart et al. | |
| 3,381,022 A | 4/1968 | Le Suer | |
| 3,442,808 A | 5/1969 | Traise et al. | |
| 3,912,764 A | 10/1975 | Palmer, Jr. | |
| 4,234,435 A | 11/1980 | Meinhardt et al. | |
| 4,889,560 A | 12/1989 | Jaeger et al. | |
| 4,889,761 A | 12/1989 | Titterington et al. | |
| 5,195,430 A | 3/1993 | Rise | |
| 5,221,335 A | 6/1993 | Williams et al. | |
| 5,286,799 A * | 2/1994 | Harrison et al. .............. 525/285 |
| 5,319,030 A | 6/1994 | Harrison et al. | |
| 5,372,852 A | 12/1994 | Titterington et al. | |
| 5,389,959 A | 2/1995 | Haas | |
| 5,496,879 A | 3/1996 | Griebel et al. | |
| 5,621,022 A | 4/1997 | Jaeger et al. | |
| 5,645,632 A | 7/1997 | Pavlin | |
| 5,837,045 A | 11/1998 | Johnson et al. | |
| 5,863,319 A * | 1/1999 | Baker et al. ............... 106/31.29 |
| 5,922,118 A | 7/1999 | Johnson et al. | |
| 5,998,570 A | 12/1999 | Pavlin et al. | |
| 6,111,055 A | 8/2000 | Berger et al. | |
| 6,174,937 B1 | 1/2001 | Banning et al. | |
| 6,187,085 B1 * | 2/2001 | Wasilewski ............... 106/31.75 |
| 6,476,096 B1 * | 11/2002 | Molloy et al. ............... 523/160 |
| 6,552,160 B2 * | 4/2003 | Pavlin ...................... 528/339.5 |
| 6,730,150 B1 * | 5/2004 | Titterington et al. ..... 106/31.43 |
| 6,761,758 B2 | 7/2004 | Boils-Boissier et al. | |
| 6,811,595 B2 | 11/2004 | Boils-Boissier et al. | |
| 6,858,070 B1 | 2/2005 | Wong et al. | |
| 6,860,928 B2 | 3/2005 | Breton et al. | |
| 6,860,930 B2 | 3/2005 | Wu et al. | |
| 6,872,243 B2 | 3/2005 | Breton et al. | |
| 6,906,118 B2 | 6/2005 | Goodbrand et al. | |
| 6,989,052 B1 * | 1/2006 | Wu et al. .................. 106/31.29 |
| 2003/0103123 A1 * | 6/2003 | Snyder ...................... 347/102 |
| 2004/0102540 A1 * | 5/2004 | Jaeger et al. ................ 523/160 |
| 2005/0113482 A1 | 5/2005 | Wong et al. | |

FOREIGN PATENT DOCUMENTS

| | | |
|---|---|---|
| DE | 4205713AL | 2/1992 |
| DE | 4205636AL | 8/1993 |
| EP | 1535973AL | 6/2005 |
| WO | WO98/17705 | 4/1998 |

* cited by examiner

*Primary Examiner*—Melvin C Mayes
*Assistant Examiner*—Stefanie Cohen
(74) *Attorney, Agent, or Firm*—Marger Johnson & McCollom, P.C.

(57) ABSTRACT

Disclosed is a phase change carbon black ink composition comprising 1) a low polarity ink carrier comprising (A) a low polarity wax, optionally (B) an ester-terminated polyamide, (2) a dispersant, and (3) a carbon black colorant. The ink can be resistant to substantial aggregation and settling of the carbon black colorant in the melt and up to about the jetting temperature of the ink even when exposed to freeze thaw cycles.

24 Claims, No Drawings

CARBON BLACK INKS AND METHOD FOR MAKING SAME

CROSS-REFERENCE TO RELATED APPLICATIONS

U.S. application Ser. No. 11/181,632, filed Jul. 13, 2005, now U.S. Pat. No. 7,563,313, entitled "Ink Carriers, Phase Change Inks Including Same and Methods for Making Same," with the named inventors Adela Goredema, Christine E. Bedford, Marcel P. Breton, and Chris A. Wagner, the disclosure of which is totally incorporated herein by reference, discloses an ink carrier comprising an ester terminated oligoamide material having a substantially low polydispersity. This ink carrier can be combined with a colorant to produce an ink composition.

Copending U.S. application Ser. No. 11/291,592, entitled "Phase Change Inks and Methods for Making Same," with the named inventors Adela Goredema, Christine E. Bedford, Marcel P. Breton, and Christopher A. Wagner, the disclosure of which is totally incorporated herein by reference, discloses a phase change ink composition and a method for forming the ink composition. The phase change ink composition comprises (1) an ink carrier comprising (A) a first component which comprises a monoester wax or blend of monoesters having at least one alkyl group comprising at least 10 carbon atoms, and (B) a second component which comprises a polyalkylene wax, and (2) a urea gellant, and (3) a colorant.

U.S. application Ser. No. 11/291,540, now U.S. Pat. No. 7,563,314, entitled "Ink Carriers Containing Nanoparticles, Phase Change Inks Including Same and Methods for Making Same," with the named inventors Marcel P. Breton, Adela Goredema, Christine E. Bedford, Christopher A. Wagner, Sandra Gardner, Nan-Xing Hu, and Bruce Goodbrand, the disclosure of which is totally incorporated herein by reference, discloses an ink carrier and a method for forming same, and a phase change ink including same. The ink carrier comprises a colloidal dispersion of at least one of silica nanoparticles and metal oxide particles. The ink carrier can also include a low melting wax, and a gelling agent. The ink carrier exhibits a substantially uniform distribution of the nanoparticles so that they are discretely distributed therewithin, and are substantially resistant to the aggregation of the nanoparticles distributed therewithin.

U.S. application Ser. No. 11/291,283, now U.S. Pat. No. 7,578,875, entitled "Black Inks and Method for Making Same," with the named inventors Marcel P. Breton, Raymond W. Wong, Christine E. Bedford, Christopher A. Wagner, and Caroline Turek, the disclosure of which is totally incorporated herein by reference, discloses a phase change black ink composition comprising (1) a low polarity ink carrier comprising (A) an ester-terminated polyamide, (B) a Guerbet alcohol or a Guerbet alcohol mixture containing at least one linear alcohol, and (C) a low polarity wax, and (2) a black colorant. The ink carrier can also contain a dispersant. The ink is resistant to aggregation and settling of the black colorant when a standby-mode printer temperature for the ink is not more than about the gel temperature of the ink.

U.S. application Ser. No. 11/291,315, now U.S. Pat. No. 7,572,325, entitled "Ink Carriers, Phase Change Inks Including Same and Methods for Making Same," with the named inventors Marcel P. Breton, Adela Goredema, Christine E. Bedford, Christopher A. Wagner, Stephan Drappel, Caroline Turek, Raymond W. Wong, and Nadia Edun, the disclosure of which is totally incorporated herein by reference, discloses an ink carrier comprising (A) an antioxidant mixture comprising (a) a hindered phenol antioxidant, and (b) a hindered amine antioxidant, (B) a polyalkylene wax, (C) a functional wax, and (D) an ester-terminated amide. The low polarity ink carrier is substantially resistant to phase separation, has excellent thermal stability, resists autocatalytic degradation of the ink composition and a substantial color shift upon standing, and provides enhanced humidity resistance. This ink carrier can be combined with a colorant to produce an ink composition.

U.S. application Ser. No. 11/290,122, now U.S. Pat. No. 7,276,614, entitled "Curable Amide Gellant Compounds," with the named inventors Eniko Toma, Peter G. Odell, Adela Goredema, and Jennifer L. Belelie, the disclosure of which is totally incorporated herein by reference, discloses a compound of the formula

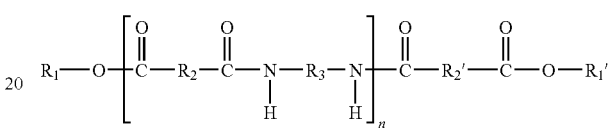

wherein R1 and R1' each, independently of the other, is an alkyl group having at least one ethylenic unsaturation, an arylalkyl group having at least one ethylenic unsaturation, or an alkylaryl group having at least one ethylenic unsaturation, R2, R2', and R3 each, independently of the others, are alkylene groups, arylene groups, arylalkylene groups, or alkylarylene groups, and n is an integer representing the number of repeat amide units and is at least 1.

U.S. application Ser. No. 11/289,882, U.S. Pat. No. 7,271,284, entitled "Process for Making Curable Amide Gellant Compounds," with the named inventors Eniko Toma, Adela Goredema, Jennifer L. Belelie, and Peter G. Odell, the disclosure of which is totally incorporated herein by reference, discloses a process for preparing a compound of the formula

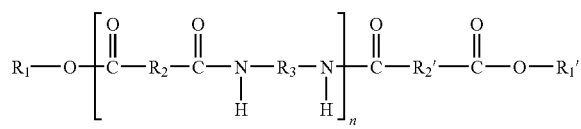

wherein R1 is an alkyl group having at least one ethylenic unsaturation, an arylalkyl group having at least one ethylenic unsaturation, or an alkylaryl group having at least one ethylenic unsaturation, R2 and R3 each, independently of the others, are alkylene groups, arylene groups, arylalkylene groups, or alkylarylene groups, and n is an integer representing the number of repeat amide units and is at least 1, said process comprising: (a) reacting a diacid of the formula HOOC—R2—COOH with a diamine of the formula

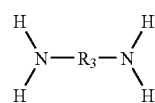

in the presence of a catalyst, a solvent, and a coupling agent to form an oligoamide intermediate of the formula

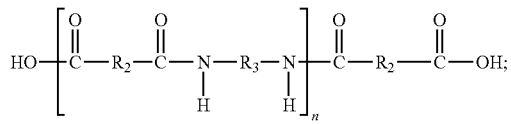

and (b) reacting the oligoamide intermediate with an alcohol of the formula R1—OH to form the product.

Copending U.S. application Ser. No. 11/290,265 entitled "Phase Change Inks," with the named inventors Trevor J. Snyder, Bo Wu, Patricia Ann Wang, Donald R. Titterington, Jule W. Thomas, Jr., Randall R. Bridgeman, and Mark H. Tennant, the disclosure of which is totally incorporated herein by reference, which discloses hot melt or phase change inks and methods for the use thereof. More specifically, disclosed are hot melt or phase change inks particularly suitable for use in phase change ink jet printing processes with reduced energy requirements. One embodiment is directed to a phase change ink composition comprising an ink carrier and a colorant, said ink being suitable for use in an indirect printing process wherein the ink is jetted from a printhead onto a heated intermediate transfer member and subsequently transferred from the intermediate transfer member to a final recording substrate, wherein: (a) the ink can be jetted from the printhead onto the intermediate transfer member when the ink is maintained at a temperature of about 125.degree. C. or lower; (b) the ink can be jetted without purging from a printer maintained at a standby temperature of about 100.degree. C. or lower; and (c) the ink has a cohesive failure temperature of at least about 56.degree. C.

BACKGROUND

Disclosed herein are carbon black phase change inks and methods for making same. In one embodiment the carbon black phase change ink composition can comprise (1) a low polarity ink carrier comprising (A) a low polarity wax, and optionally (B) an ester-terminated polyamide, (2) a dispersant, and (3) a carbon black colorant. The ink can be resistant to substantial aggregation and settling of the carbon black colorant in the melt and up to about the jetting temperature of the ink as well as when exposed to freeze thaw cycles. In one embodiment, the phase change ink can be a low energy carbon black phase change ink.

Another embodiment is directed to a method which comprises (a) incorporating into an ink jet printing apparatus the above-described phase change ink composition; (b) melting the ink; (c) causing droplets of the melted ink to be ejected in an image wise pattern onto an intermediate transfer member; and (d) transferring the ink in the image wise pattern from the intermediate transfer member to a final recording substrate.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink j et printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

U.S. Pat. No. 5,783,657, U.S. Pat. No. 5,998,570 and WO 98/17704, (Pavlin et al), the disclosures of each of which are totally incorporated herein by reference, disclose a low molecular weight, ester-terminated polyamide that may be blended with a liquid hydrocarbon to form a transparent composition having gel consistency. The ester-terminated polyamide is prepared by reacting "x" equivalents of dicarboxylic acid wherein at least 50 percent of those equivalents are from polymerized fatty acid, "y" equivalents of diamine such as ethylene diamine, and "z" equivalents of monoalcohol having at least 4 carbon atoms. The stoichiometry of the reaction mixture is such that $0.9 \leq \{x/(y+z)\} \leq 1.1$ and $0.1 \leq \{z/(y+z)\} \leq 0.7$. The reactants are heated until they reach reaction equilibrium.

U.S. Pat. No. 6,111,055 (Berger, et al), the disclosure of which is totally incorporated herein by reference, discloses an ester terminated dimer acid-based polyamide which is blended with a solvent to form a gel. The solvent may be flammable, and a wick may be added to the resulting gel to form a candle. The said ester terminated dimmer acid-based polyamide is prepared by thermal condensation of a diacid, a diamine and a monoalcohol.

Compositions suitable for use as phase change ink carrier compositions are known and are described in U.S. patent application Ser. No. 10/881,047, the disclosure of which is totally incorporated herein by reference.

U.S. Pat. No. 6,878,198, the disclosure of which is totally incorporated herein by reference, discloses a phase change ink composition comprising (a) an ink carrier comprising a monoamide and a tetra-amide, and (b) oxidized pigment particles, said pigment particles having oxygen-containing functional groups on the surfaces thereof.

U.S. Patent Application 20050113482, the disclosure of which is totally incorporated herein by reference, also discloses a process for preparing a phase change ink composition which comprises (a) a phase change ink carrier, said carrier comprising at least one nonpolar component and at least one polar component, and (b) pigment particles, said process comprising (1) selecting at least one of the polar carrier components to be a pigment particle dispersant; (2) admixing the pigment particles with the dispersant; (3) extruding the mixture of pigment particles and dispersant in an extruder at a temperature that is at or above the peak crystallization temperature of the dispersant and below about the peak melting temperature of the dispersant, thereby forming a pigment dispersion; (4) subsequent to extrusion of the pigment dispersion, adding to the pigment dispersion any remaining polar components and the nonpolar component; and (5) subjecting the resulting mixture of pigment dispersion, polar component, and nonpolar component to high shear mixing to form an ink.

European Patent Application 1535973 A1, the disclosure of which is totally incorporated herein by reference, discloses an ink composition comprising (a) an ink carrier which comprises a monoamide, a tetra-amide, or a mixture thereof; (b) a polyalkylene succinimide; and (c) pigment particles.

A need remains for improved phase change inks, and in one embodiment, low energy solid inks which permit phase change ink jet printers to perform at more moderate operating conditions, some of which include a lower drum temperature and a reduced pre-heat temperature for substrates, than with conventional phase change inks. For example, a need exists for phase change carbon black inks which can be jetted at a temperature lower than conventional jetting temperature as described below. These carbon black inks can also have excellent robustness. This can be achieved with the use of gellants. There is consequently a need for carbon black ink compositions that enables the use of gellants at lower than conventional operating conditions and ink compositions that do not interfere with the gelling process. While these carbon black inks give excellent print quality and performance at higher energy levels, there is still a need for carbon black inks that minimize penetration of the colorant in the paper during the transfer/fusing stage of the printing process for minimum show-through after fusing at low energy conditions. Furthermore, there is a need for carbon black phase change inks that generate prints with good performance in automatic document feeders. Additionally, there is a need for stable (no settling of pigment) carbon black ink dispersions. Thus, a need exists for a carbon black phase change ink which is resistant to aggregation and settling of the carbon black pigment particles, and more particularly, in a phase change ink jet printer, when the standby-mode printer temperature for the ink is at less than the temperature at which the gel transition for the ink is observed. Moreover, a need remains for carbon black phase change inks that print successfully on paper and transparency stock. The ability to meet the needs described above regarding black phase change inks per se are even more difficult to achieve for carbon black phase change inks because of the problems associated with the handling of carbon black materials.

SUMMARY

Many phase change inks currently being used in solid ink jet piezoelectric printers employ high jetting temperatures (about 140° C.) and long warm-up times. The images currently produced by these inks can also, in many instances, exhibit poor scratch resistance and image permanence.

Disclosed herein is a carbon black phase change ink composition comprising (1) a low polarity ink carrier comprising (A) a low polarity wax, and optionally (B) an ester-terminated polyamide, (2) a dispersant, and (3) a carbon black colorant. In an embodiment the carbon black phase change ink composition can be low energy in nature.

A method can also be provided which (a) comprises forming the above-described ink; (b) melting the ink; and (c) causing droplets of the melted ink to be ejected in an image wise pattern onto a substrate.

DETAILED DESCRIPTION

A problem with many current phase change inks is that they can suffer from poor robustness. The low energy inks can also have this problem. Within the context of this application, low energy phase change inks are defined as those for which at least one of the following printing process temperatures is below the set temperatures for a solid ink printer, such as the Xerox Phaser 860: 1) jetting temperature; 2) standby temperature; and 3) intermediate drum temperature. The jetting temperature for a low energy phase change ink in one embodiment is less than about 120° C., in another embodiment the stand-by temperature is less than about 110° C., and in a further embodiment the intermediate drum temperature is less than about 65° C.

In an embodiment, robustness can be increased by adding a gellant to the vehicle. Inks containing gellants are described in U.S. Pat. Nos. 6,906,118, 6,761,758, 6,811,595, 6,860,928, and 6,872,243, the disclosures of which are incorporated herein in their entirety by reference. In these inks, the gels can be created through the initial assembly of the gelator molecules into fibrous nanostructures which then further form into a three dimensional lattice, trapping the vehicles within the voids of the network. Gels can be formed by small organic molecules in organic solvents and are often referred to as physical gels. In these systems, the three dimensional network can be held together by non-covalent bonds such as hydrogen bonding and Van Der Waals interactions. In one embodiment, the molten vehicle can be trapped in these three dimensional networks, giving a more robust ink upon solidification. A gellant can also be added to the vehicle to make the ink more robust and assist in controlling transfuse properties. The gellant can also facilitate the control of drop spreading on the intermediate substrate when the inks are used in an indirect printing process, providing for improved image uniformity and dot to dot coalescence on the intermediate substrate prior to transfer. These improvements in turn can result in increased overall print quality. The gellant can make the ink tough by undergoing physical cross linking with some of components of the molten vehicle. It can enable a thermally-controlled and reversible viscoelastic gel phase change of the molten ink.

In a further embodiment, adding a gellant can modify the rheological profile of the ink often recognized by the presence of a viscosity plateau at temperatures above the ink crystallization temperature. This can be described as the gel state. In this state, the gelled inks exhibit visco-elastic Theological characteristics that are different from those of conventional hot melt or phase change inks in that they show an elastic behavior in a temperature region where the ink is supposed to be in the liquid state. The gel state can have a gel point, associated with the onset of gelation upon cooling. The gel point is evidenced by the crossover of G' (storage modulus) and G" (loss modulus), with G' being higher than G", indicating that the material is elastic.

The gel point can in one embodiment be at a temperature equal to or less than about 110° C., in another embodiment equal to or less than about 95° C., and in a further embodiment equal to or less than about 90° C., although the temperature can be outside of these ranges. In still a further embodiment, the gel point is at a temperature above the melting point of the phase change ink carrier.

Upon cooling, gelation can occur before crystallization. The crystallization temperature in one embodiment is equal to or less than about 95° C., in another embodiment equal to or less than about 90° C., and in a further embodiment equal to or less than about 85° C., although the temperature can be outside of these ranges.

A low energy carbon black phase change ink composition can be produced comprising (1) a low polarity ink carrier containing (A) a low polarity wax, optionally (B) an ester-terminated polyamide, (2) a dispersant, and (3) a carbon black colorant.

These phase change carbon black ink compositions can be designed to meet the conditions for low energy printing. These low energy carbon black inks can, in some embodiments, have advantages over existing solid dye based and/or high melting carbon black inks. In one embodiment, the carbon black inks can facilitate control of the penetration of the ink into the paper during the transfer/fusing stage of the printing process for minimum show-through over a wide range of transfuse conditions. In another embodiment, the carbon black inks can exhibit substantially none of the problems associated with the use of dye colorants such as dye migration and poor light fastness. Furthermore, these low energy inks can be stable (substantially resistant to settling and/or aggregation of the pigment particles) carbon black dispersions. In an embodiment, about one hundred gram samples of molten carbon black ink can be filtered through a 0.45 micron glass fiber disc filter at temperatures from about 110° C. equal to or less than about 135° C. within about 6 min. In a further embodiment, a one hundred gram sample of the ink can be filtered through the 0.45 micron filter in an amount of time equal to or less than 5 minutes, in another embodiment equal to or less than 4 minutes, and in still a further embodiment equal to or less than 3 minutes, although the filter times can be outside of these ranges. After aging this carbon black ink for about one week at about 110° C., a 100 g aliquot of that ink will have about the same filtration characteristics as the counterpart non-aged carbon black ink. In addition, the ratio of the filtration time of the aged ink with respect to the non-aged ink in one embodiment is equal to or less than about 1.5, in another embodiment equal to or less than about 1.2, and in a further embodiment equal to or less than about 1.0, although this ratio can be outside of these ranges. The filtration data can be obtained under a substantially constant pressure. In one embodiment this substantially constant pressure is equal to or less than about 30 psi, in another embodiment equal to or less than about 25 psi, in a further embodiment equal to or less than 20 psi, and in still a further embodiment equal to or less than 15 psi, although the pressure can be outside of these ranges.

These ink compositions can be designed so that they do not substantially interfere with the process of gelation. This ink carrier system can facilitate the formation of a preponderance of gel structures which in turn can improve resistance to aggregation and settling of the carbon black ink colorant.

The low energy carbon black inks can have many advantages over current dye based solid inks. They can be lower cost. They can have a lower print head stand-by temperature in one embodiment of from about 85° C. to equal to or less than about 130° C. The inks can also have a lower jetting temperature in an embodiment of from about 105° C. to equal to or less than about 130° C. When employed in indirect printing processes wherein the ink is first jetted onto a heated intermediate transfer drum and subsequently transferred from the heated drum to a final substrate, these inks can also have a lower drum temperature in one embodiment of from about 45° C. to equal to or less than about 55° C., and in a further embodiment equal to or less than about 20° C. below the drum temperature used for the current phase change ink, about 64 degrees C. Furthermore, the subject inks can be employed using in one embodiment a minimum amount of paper pre-heating, and in another embodiment no paper pre-heating. Moreover, these inks can function in one embodiment from a paper pre-heat temperature of from about 40° C. to temperature equal to or less than 80° C. The inks can in an embodiment be fused or transfused or transferred to a substrate at a load pressure as low as about 300 psi. Conventional inks are fused or transfused or transferred at about 700-900 psi loads. The carbon black inks can also enable low pile height, in a further embodiment of from about 5 microns up to or less than about 10 microns. This low pile height can facilitate better write ability, lower crease and higher durability.

In another embodiment the above advantages can be enhanced through the use of post-fusing. Thus, the low energy carbon black phase change inks disclosed herein can be further treated with pressure/heat or heat alone to further enhance one or more imaging performance characteristics. In one embodiment, adhesion to paper and scratch resistance can be increased as a result of the ink being moved further into the interstices of the paper substrate. This property can be enabled by the rheology of the carbon black inks which can have equal to or less than about a 20° C. difference between the onset of crystallization, which is one embodiment can be at about 80° C., and the tail end of the melt transition, which in another embodiment can be about 100° C. Upon heating, the ink changes from a solid at room temperature to a low viscosity liquid at the print head standby temperature. In one embodiment, the corresponding temperature range can be from about 80° C. to up to or less than about 95° C. In another embodiment, this can provide an opportunity, in a temperature range of from about 60° C. to up to or less than about 95° C., to post-fuse the image.

A method can also be provided which comprises (a) forming the above-described ink; (b) melting the ink; and (c) causing droplets of the melted ink to be ejected in an image wise pattern onto a substrate. The method can also include a transfuse step. In another embodiment, the method can further include a simultaneous transfuse and fusing step of an image wise pattern. A discussion of direct and indirect printing involving phase change inks is provided in column 21, lines 3 to 35 of U.S. Pat. No. 6,858,070, which is incorporated herein in its entirety by reference.

The low polarity of the ink vehicle can be defined by determining its solubility parameter and that of the ink components. The ink formulation in one embodiment comprises at least about 85% by weight, in another embodiment at least about 90% by weight, and in a further embodiment at least about 95% by weight of the ink carrier, although the % by weight of the ink carrier can be outside of these ranges. Moreover, the ink carrier can have a total solubility parameter (including dispersive, polar and hydrogen bonding components) in one embodiment of equal to or less than about 21 $(MPa)^{0.5}$, in another embodiment equal to or less than about 19 $(MPa)^{0.5}$, and in a further embodiment equal to or less than about 17 $(MPa)^{0.5}$, although the total solubility parameter can be outside of these ranges. The most hydrophobic components of the ink composition can have polar bonding components which are substantially low. The polar component of the solubility parameter in one embodiment is equal to or less than about 2 $(MPa)^{0.5}$, in another embodiment is equal to or less than about 1.5 $(MPa)^{0.5}$, and in a further embodiment is equal to or less than about 1 $(MPa)^{0.5}$, although the polar component can be outside of these ranges.

The subject phase change inks can also have a relatively low surface energy. Typically these inks can have a surface energy which in one embodiment can be equal to or less than about 33 dynes/cm, in another embodiment equal to or less than about 30 dynes/cm, in a further embodiment equal to or less than about 28 dynes/cm, and in still a further embodiment equal to or less than about 25 dynes/cm, although the surface energy can be outside of these ranges.

The ink can be resistant to aggregation and settling of the carbon black colorant when the standby-mode printer temperature for the ink is approaching the gel transition temperature of the ink. In one embodiment the gel transition temperature of the ink can be designed to be at least about 3° C., in another embodiment at least about 10° C., and in a further embodiment at least about 15° C., and in one embodiment equal to or less than about 40° C., in another embodiment equal to or less than about 50° C., and in a further embodiment equal to or less than about 55° C., below the jetting temperature of the ink, although the onset of the gel transition can be outside of these ranges The low energy carbon black phase change ink can have a minimum show-through of the carbon black colorant. Show-through can be defined as the increase in optical density that can be measured on the backside of a paper as a result of printing a solid image on the front side of the same paper. In one embodiment the optical density increase can be equal to or less than about 0.1 optical density units, in another embodiment equal to or less than about 0.075 optical density units, and in a further embodiment equal to or less than about 0.05 optical density units, although the show-through can be outside of these ranges.

An ester-terminated amide can optionally be employed as the gelling agent in the ink carrier disclosed herein. Examples of suitable ester-amide compounds and the preparation thereof are disclosed in, for example, U.S. Pat. No. 5,863,319, U.S. Pat. No. 5,645,632, and U.S. Pat. No. 5,783,657, the disclosures of each of which are totally incorporated herein by reference. Suitable ester-amides are also commercially available as, for example, UNI-REZ® 2980 and UNI-CLEAR® 80 and 100 (commercially available from Arizona Chemical), and the like.

In one specific embodiment, the ester-amide compound has a melting point of at least about 50° C., although the melting point can be outside of this range. In another specific embodiment, the ester-amide compound has a melting point equal to or less than about 160° C., although the melting point can be outside of this range. In a further specific embodiment, the ester-amide compound has a viscosity at about 140° C. of at least about 20 cps, although the viscosity can be outside of this range. In still another specific embodiment, the ester-amide compound has a viscosity at about 140° C. equal to or less than about 400 cps, although the viscosity can be outside of this range.

The material which provides a gel structure to the ink upon cooling is an ester-amide material. The ester-amide can be present in the ink carrier in one embodiment at least about 0.5% by weight, in another embodiment at least about 3% by weight, and in yet another embodiment at least about 6% by weight, and in one embodiment equal to or less than about 20% by weight, in another embodiment equal to or less than about 15% by weight, and in yet another embodiment equal to or less than about 10% by weight, although the amount can be outside of these ranges.

The viscosity within the gel transition region may not always be a constant. The viscosity in the gel phase can in one embodiment be identified by the presence of one or more plateau-like transition area(s) in a graphical plot of viscosity versus temperature. This plateau-like transition area can be present in a temperature range in which the low temperature limit is in one embodiment of at least about 50° C., in another embodiment at least about 65° C., and the high temperature limit is in an embodiment equal to or less than about 80° C., and in another embodiment equal to or less than about 95° C., in a further embodiment equal to or less than about 100° C., and in an even further embodiment equal to or less than about 105° C., although the transition area can be outside of these ranges. The viscosity for the plateau-like transition area(s) in one embodiment is at least about 100 cps, in another embodiment is at least about 500 cps, and in a further embodiment is at least about 1000 cps, although the viscosity can be outside of these ranges. In this context, the viscosity within the plateau region which can be constant or may vary within the gel transition, the rate with which the viscosity is changing being dependent on both the composition of the ink and the analytical conditions used to measure the rheological properties of the ink.

A wax carrier can also be employed. A low polarity wax comprising a polyalkylene wax, such as a polyethylene wax, a polypropylene wax, or mixtures thereof, can also be included in the carrier. The polyalkylene wax(es) can be present in the ink carrier in one embodiment of at least about 25% by weight of the ink carrier, in another embodiment of at least about 30% by weight of the ink carrier, and in yet another embodiment of at least about 35% by weight of the ink carrier, and in one embodiment equal to or less than about 65% by weight of the ink carrier, in another embodiment equal to or less than about 55% by weight of the ink carrier, and in yet another embodiment equal to or less than about 45% by weight of the ink carrier, although the amount can be outside of these ranges. Examples of suitable polyalkylene waxes include POLYWAX® 500 (commercially available from Baker Petrolite) and distilled POLYWAX® 500, in one embodiment having a viscosity at a jetting temperature of about 110 degree C. of about 10% to about 100% higher than the viscosity of the undistilled POLYWAX® 500, POLYWAX® 400 commercially available from Baker Petrolite and distilled POLYWAX® 400, Vybar 103 and 253 commercially available from Baker Petrolite, POLYWAX® 655 and higher molecular weight polywax materials are also suitable. The molecular weight of the POLYWAX® can be in the range of 400 to 600 g/mole.

Functional wax(es) can also be included in the ink carrier. In an embodiment herein the functional wax can be an alcohol wax, or a blend thereof. The alcohol wax(es) can be present in the ink carrier in any desired or effective amount, in one embodiment of at least about 15% by weight of the ink carrier, in another embodiment of at least about 25% by weight of the ink carrier, and in yet another embodiment of at least about 30% by weight of the ink carrier, and in one embodiment of equal to or less than about 65% by weight of the ink carrier, in another embodiment of equal to or less than about 55% by weight of the ink carrier, and in yet another embodiment of equal to or less than about 45% by weight of the ink carrier, although the amount can be outside of these ranges.

In an embodiment, a blend of alcohol waxes can be employed, in one embodiment a blend of mono- di-, tri- or tetra-alcohol waxes. The relative proportions of each of the alcohol waxes can be provided so as to maintain a predetermined hydroxyl number for the ink carrier.

The hydroxyl number (ASTM E-222-00 mod.) of the ink carrier is in one embodiment of at least about 20, in another embodiment of at least about 25, and in yet another embodiment of at least about 35, and in one embodiment of equal to or less than about 100, in another embodiment equal to or less than about 80, and in yet another embodiment equal to or less than about 50, although the hydroxyl number can be outside of these ranges. The alcohol wax(es) in one embodiment can have a melting point of at least about 50° C., in another embodiment of at least about 60° C., and in a further embodiment of at least about 70° C., in one embodiment equal to or less than about 110° C., in another embodiment equal to or less than about 105° C., and in a further embodiment equal to or less than about 100° C., although the melting point can be outside of these ranges.

Examples of suitable alcohol waxes include UNILIN® 350 and UNILIN® 425 (commercially available from Baker Petrolite), distilled functional waxes, the viscosity of which at the jetting temperature in one embodiment can be from about 5 to about 50% higher than the non-distilled functional wax (es). Mono functional waxes which can be employed herein are those commercially available from Aldrich which include; 1-docosanol, 1-tetradecanol, 1-pentadecanol, 1-hexadecanol, 1-heptadecanol, 1-octadecanol, 1-nonadecanol, 1-eicosanol, 1-tricosanol, 1-tetracosanol, 1-pentacosanol, 1-hexacosanol, 1-heptacosanol, 1-octacosanol, 1-nonacosanol, 1-tricontanol, 1-dotriacontanol, 1-tritriacontanol, 1-tetratriacontanol. Also suitable are Guerbet alcohols such as 2-tetradecyl 1-octadecanol, 2-hexadecyl 1-eicosanol, 2-octadecyl 1-docosanol, 2-nonadecyl 1-tricosanol, 2-eicosyl tetracosanol, and mixtures thereof. Di-functional waxes can include the waxes of diols such as 1,8-octanediol, 1,9-nonanediol, 1,10-decanediol, 1,12-dodecanediol, 1,13-tridecanediol, 1,14-tetradecanediol, 1,15-pentadecanediol, 1,16-hexandecanediol, 1,17-heptadecanediol, 1,18-octadecanediol, 1,19-nonadecanediol, 1,20-eicosanediol, 1,22-docosanediol, 1,25-pentacosanediol, and mixtures thereof. Other polyhydric alcohols that can be used in the ink are trimethylolpropane, pentaerythritol, neopentylglycol, mannitol, sorbitol, and mixtures thereof, including mixtures with the above mentioned mono- and di-functionalized alcohols.

In addition, the ink carrier disclosed herein can comprise a rosin ester resin, a liquid or solid plasticizer, and/or a fatty amide, such as monoamides, diamides, triamides and tetraamides, mixtures thereof and the like. Optionally, the ink of this ink carrier may also contain UV stabilizers.

The amide can be present in one embodiment in an amount of at least about 1% by weight of the ink carrier, in another embodiment of at least about 2% by weight of the ink carrier, and in yet another embodiment of at least about 3% by weight of the ink carrier, and in one embodiment equal to or less than about 30% by weight of the ink carrier, in another embodiment equal to or less than about 15% by weight of the ink carrier, and in yet another embodiment equal to or less than about 5% by weight of the ink carrier, although the amount can be outside of these ranges. Examples of suitable amides include stearyl stearamide, a tetra amide resin obtained from the reaction of one equivalent of dimer acid with two equivalents of ethylene diamine and UNICID® 700 (commercially available from Baker Petrolite, a carboxylic acid derivative of a long chain alcohol), prepared as described in Example 1 of U.S. Pat. No. 6,174,937, the entire disclosure of which is being totally incorporated herein by reference, and the like, as well as mixtures thereof.

The ink carrier may contain a branched triamide such as those described in U.S. Pat. No. 6,860,930, the disclosure of which is totally included here by reference.

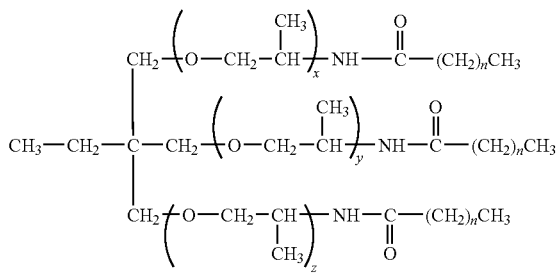

Wherein n has an average value of from about 34 equal to or less than 40, where x, y and z can each be zero or an integer, and wherein the sum of x, y, and z is from about 5 and equal to or less than 6.

A dispersant or mixtures of dispersants can be present in the ink in any desired or effective amount for purposes of dispersing and stabilizing the pigment in the ink vehicle. The dispersant, in one embodiment of at least about $1 \times 10^{-3}$% by weight of the ink carrier, in another embodiment of at least about $1 \times 10^{-2}$% by weight of the ink carrier, and in yet another embodiment of at least about $5 \times 10^{-1}$% by weight of the ink carrier, and in one embodiment equal to or less than about 30% by weight of the ink carrier, in another embodiment equal to or less than about 20% by weight of the ink carrier, and in yet another embodiment equal to or less than about 10% by weight of the ink carrier, although the amount can be outside of these ranges. Specific examples of suitable dispersants are polyalkylene succinimide dispersants such as those disclosed in U.S. Pat. No. 6,858,070, the disclosure of which is totally incorporated herein by reference. Dispersants can include the Chevron Oronite OLOA 11000, OLOA 11001, OLOA 11002, OLOA 11005, OLOA 371, OLOA 375, OLOA 411, OLOA 4500, OLOA 4600, OLOA 8800, OLOA 8900, OLOA 9000, OLOA 9200 and the like, commercially available from Chevron Oronite Company LLC, Houston, Tex., as well as mixtures thereof. Examples of suitable polyalkylene succinimides and their precursors and methods of making them are disclosed in, for example, U.S. Pat. Nos. 3,172,892, 3,202,678, 3,280,034, 3,442,808, 3,361,673, 3,172,892, 3,912,764, 5,286,799, 5,319,030, 3,219,666, 3,381,022, 4,234,435, and European Patent Publication 0 776 963, the disclosures of each of which are totally incorporated herein by reference. Where the dispersant is a polyalkylene succinimide of the formula 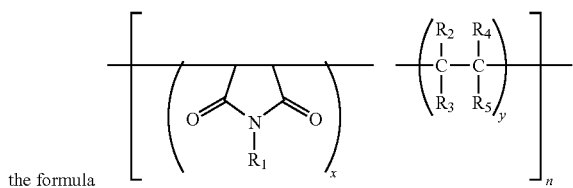

wherein x is an integer representing the number of repeating succinimide units, y is an integer representing the number of repeating alkylene units, n is an integer representing the number of repeating units, $R_1$ is an alkyl group, an aryl group, an arylalkyl group, or an alkylaryl group, and $R_2$, $R_3$, $R_4$, and $R_5$ each, independently of the others, is a hydrogen atom or an alkyl group.

Also suitable is Ircosperse 2155, available from Lubrizol Corp., a succinimide with 56% active succinimide groups.

The ink carrier can be present in the phase change ink prepared in one embodiment in an amount of at least about 50% by weight of the ink, in another embodiment of at least about 60% by weight of the ink, and in yet another embodiment of at least about 70% by weight of the ink, and in one embodiment equal to or less than about 99% by weight of the ink, in another embodiment equal to or less than about 98% by weight of the ink, and in yet another embodiment equal to or less than about 95% by weight of the ink, although the amount can be outside of these ranges.

In one specific embodiment, the ink carrier has a melting point of less than about 120° C., and in another embodiment of less than about 110° C., although the melting point of the ink carrier can be outside of these ranges.

The inks can contain any desired or effective carbon blacks provided that the pigment can be dispersed in the ink vehicle, preferably those oxygen-containing functional groups on the surfaces thereof Groups such as oxygen-containing acidic groups can be placed on the surface of pigment particles by oxidation with materials such as nitric acid or ozone. Pigments having oxygen-containing functional groups on the surface thereof are known. Examples of commercially available pigments suitable for the inks include (but are not limited to) SPECIAL BLACK 100, SPECIAL BLACK 250, SPECIAL BLACK 350, FW1, FW2 FW200, FW18, SPECIAL BLACK 4, NIPEX 150, NIPEX 160, NIPEX 180, SPECIAL BLACK 4, SPECIAL BLACK 5, SPECIAL BLACK 6, PRINTEX 80, PRINTEX 90, PRINTEX 140, PRINTEX 150T, PRINTEX 200, PRINTEX U, and PRINTEX V, all available from Degussa, MOGUL L, REGAL 400R, REGAL 330, and MONARCH 900, available from Cabot Chemical Co., MA77, MA7, MA8, MA11, MA100, MA100R, MA100S, MA230, MA220, MA200RB, MA14, #2700B, #2650, #2600, #2450B, #2400B, #2350, #2300, #2200B, #1000, #970, #3030B, and #3230B, all available from Mitsubishi, RAVEN 2500 ULTRA, Carbon Black 5250, and Carbon Black 5750 available from Columbia Chemical Co., pigments such as those disclosed in U.S. Pat. No. 5,837,045 and U.S. Pat. No. 5,922,118, the disclosures of each of which are totally incorporated herein by reference, and the like, as well as mixtures thereof.

Examples of most suitable carbon blacks are REGAL 330® (commercially available from Cabot), Carbon Black 5250, Carbon Black 5750 (commercially available from Columbia Chemical), SPECIAL BLACK® 4 (commercially available from Degussa Chemicals), Nipex 150 from Degussa Chemicals and the like, or mixtures thereof.

In one specific embodiment, the pigment particles have a primary volume average particle size in one embodiment of no less than about 0.01 micron as measured by electron microscopy according to ASTM 3849, and in one embodiment of no more than about 0.1 micron as measured by electron microscopy according to ASTM 3849, in another embodiment of no more than about 0.08 micron, although the primary particle size can be outside of these ranges. By primary average particle size is meant the size of the primary particles of carbon black present in the ink; these primary particles form aggregates of 2 or more particles when present in the ink. In one specific embodiment, the primary particles form aggregates that have absorption values, as determined by ASTM method D2414, of at least about 45 cc/100 g of dibutyl phthalate oil, and in another embodiment of at least about 50 cc/100 g, and in one embodiment the primary particles form aggregates of no more than about 200 cc/100 g, and in another embodiment of no more than about 110 cc/100 g.

The carbon black having oxygen-containing functional groups on the surfaces thereof is present in the phase change ink in any desired or effective amount to obtain the desired color or hue, in one embodiment at least about 0.1 percent by weight of the ink, in another embodiment at least about 0.2 percent by weight of the ink, and in yet another embodiment at least about 0.5 percent by weight of the ink, and in one embodiment no more than about 50 percent by weight of the ink, in another embodiment no more than about 20 percent by weight of the ink, and in yet another embodiment no more than about 10 percent by weight of the ink, although the amount can be outside of these ranges.

The ink carriers can also optionally contain an antioxidant. The optional antioxidants of the ink compositions protect the ink components from oxidation during the heating portion of the ink preparation and jetting processes. Specific examples of suitable antioxidants are set forth in U.S. Pat. No. 6,858,070, col. 17, lines 25-36, the disclosure of which is totally incorporated herein by reference. When present, the optional antioxidant is present in the ink in any desired or effective amount, in one embodiment of at least about 0.01% by weight of the ink carrier, in another embodiment of at least about 0.1% by weight of the ink carrier, and in yet another embodiment of at least about 1% by weight of the ink carrier, and in one embodiment of equal to or less than about 20% by weight of the ink carrier, in another embodiment equal to or less than about 5% by weight of the ink carrier, and in yet another embodiment equal to or less than about 3% by weight of the ink carrier, although the amount can be outside of these ranges. When only one antioxidant is used, a hindered amine is preferred, e.g.: Naugard 445 antioxidant (obtained from Uniroyal Chemical Co., Middlebury, Conn. or Crompton Corporation).

The ink disclosed herein can also contain resins and waxes such as: Crodamide 203 (commercially available from Croda), Crodamide ORX (commercially available from Croda), Kemamide S-180 and E-180 (commercially available from Witco), Unislip 1750 (commercially available from Uniqema, Uniclear 80 (commercially available from Arizona), a dicapryladipate compatibilizer such as Arizona SP-100, Vybar 263 and 243 (commercially available from Baker Petrolite), 1-docosanol (commercially available from Aldrich), Unilin 700 (commercially available from Baker Hughes), Beeswax Cerra Bellina (commercially available from Kester), branched BK-42 ester (commercially available from Kester), Kester Wax K82-D, hydroxypolyester K-82-P, synthetic Karnauba K-82-H, Siliconyl Beeswax (commercially available from Kester), stearyl alcohol 98 NF (commercially available from Kester), Kraton D1101 (commercially available from Kraton Polymers), Behenyl Behenate, straight chain even numbered mono esters having a carbon chain from C-40 to C44 (commercially available from Kester as Kester Wax 72), synthetic paraffin wax of a sharp melting point such as Callista 158 (commercially available from Shell), microcrystalline branched hydrocarbon waxes such as Microwax HG (commercially available from Paramelt), Mp=80-86, and Microwax P827, Kemamide S-221, polyethyleneglycol 400 distearate (commercially available from Mosselman); paraffin waxes such as HNP-9 and HNP-12 (commercially available from Nippon Seiro Co.); semi-crystalline wax such as HIMIC-2065 (commercially available from Nippon Seiro Co.); hydrogenated styrene-butadiene copolymers of low molecular weight such as Tuftec H1141.11102 (commercially available from Asahi Kasei Corp); ethylene-propylene copolymers such as EP-700 and EP-602 (commercially available from Baker Hughes); Unithox 420 ethoxylate (commercially available from Baker Hughes); propylene-ethylene copolymer alcohols of melting point in the range of 65 to 100° C. (commercially available from Baker Hughes); maleic anhydride mono-isopropyl maleate such as Ceramer 1251 (commercially available from Baker Hughes); alpha olefin-maleic anhydride polymer of melting point of about 80 degree C. (commercially available from Baker Petrolite) (X-5399); oxidized ethene homopolymer, Petrolite C-9500 (commercially available from Baker Hughes); oxidized 1-propene with ethane, Cardis 314, (commercially available from Baker Hughes), Victory Amber wax (commercially available from Bareco), oxidized PE such as OX-020T (commercially available from Nippon Seiro Co.). The ink can also contain paraffin waxes and microcrystalline waxes. Paraffin wax is a straight chain hydrocarbon having a melting point of about 49 to 71 degree C.; microcrystalline wax is separated from asphalts and is higher in MW and more branched than the paraffin wax. The melting point of microcrystalline waxes is between 60 and 89° C. Examples of suitable paraffin waxes are HNP-3, 5, 9, 10, 11 and HNP-12 (commercially available from Nippon Seiro Co.).

A number of suitable methods are available for preparing the phase change ink composition such as the one described in US Patent Application 20050113482, the disclosure of which is totally incorporated herein by reference. In one embodiment, the phase change ink composition is prepared as follows:

Step 1: A carbon black dispersion concentrate is prepared by melting in an appropriate container, while mixing, the polar components of the ink formulation, a tetra-amide resin, obtained from the reaction of one equivalent of dimer acid with two equivalents of ethylene diamine and Unicid 700 (obtained from Baker Petrolite, Tulsa, Okla., a carboxylic acid derivative of a long chain alcohol, prepared as in Example 1 of U.S. Pat. No. 6,174,937, col. 49, line 53 to Col. 50, line 27, the disclosure of which is totally incorporated herein by reference, a mono-amide resin, e.g.: Kemamide S180, from Crompton Corp., triglycerides of hydrogenated abietic (rosin) acid, e.g.: K-100 resin from Arakawa Chemical Industries, Ltd, a dispersant, e.g.: OLOA 11000 from Chevron Chemical, with carbon black in presence of an antioxidant, e.g.: Naugard N445, from Crompton Corp, at a temperature ranging from about 110 to about 150° C., preferably between 120 and 130° C.

Step 2: Heat and stir the resulting carbon black dispersion for at least one hour in the temperature range of 110 to 150° C.

Step 3. While the carbon black dispersion of Step 2 is being heated and stirred, melt-mix in a separate container the low polarity wax components, Polywax 500 from Baker Petrolite, pre-filtered through a 0.45 micron glass fiber filter at a temperature of about 110° C. and Unilin 425, from Baker Petrolite with the optional gellant, Uniclear 100, Arizona Chemicals, Step 4. Heat and stir the resulting molten composition of Step 3 for at least one hour.

Step 5. The carbon black dispersion of Step 2 is further homogenized with an IKA Ultra Turrax T50 Homogenizer for about 30 minutes to about 60 min at from about 7000 to about 10000 rpm, preferably about 10,000 rpm, while maintaining the temperature at about 120° C. to about 130° C.; subsequently the molten composition of step 4 is added to the homogenized pigment dispersion and the resulting carbon black dispersion mixture is further homogenized for about 30 to 60 minutes to give the ink of the present invention.

Step 6. The carbon black ink of Step 5 is filtered subsequently through a 1 micron and then a 0.45 micron glass fiber cartridge-filter at a temperature ranging from about 120 to 130° C., and cooled to room temperature.

In another embodiment, the phase change ink composition is prepared as above except that the gellant is added in Step 1 instead of Step 3. In a further embodiment, the phase change ink composition is prepared as in the embodiment above except that the carbon black is first pre-dispersed under high shear conditions (example, under homogenization or extrusion process conditions) with the tetra-amide resin, the dispersant, the gellant, prior to being added to the other ink components. The optimum shear conditions can be achieved by controlling the temperature, from about 100 to about 150° C., and/or by adding a portion of the lower viscosity mono-amide resin. In a further embodiment, the phase change ink composition is prepared as in the first embodiment above except that Step 3 is replaced by a process that involves adding each individual molten wax separately into the dispersion of Step 2 with the most polar wax component being added first.

The ink compositions in one embodiment have melting points of not lower than about 40° C., in another embodiment of not lower than about 60° C., and in yet another embodiment of not lower than about 70° C., and have melting points in one embodiment equal to or less than about 140° C., in another embodiment equal to or less than about 130° C., and in yet another embodiment equal to or less than about 120° C., although the melting point can be outside of these ranges.

The ink compositions generally have melt viscosities at the jetting temperature in one embodiment no lower than about 75° C., in another embodiment no lower than about 100° C., and in yet another embodiment no lower than about 120° C., and in one embodiment equal to or less than about 180° C., and in another embodiment equal to or less than about 150° C., although the jetting temperature can be outside of these ranges, in one embodiment of equal to or less than about 30 cps, in another embodiment of equal to or less than about 20 cps, and in yet another embodiment of equal to or less than about 15 cps, and in one embodiment of no less than about 2 cps, in another embodiment of no less than about 5 cps, and in yet another embodiment of no less than about 7 cps, although the melt viscosity can be outside of these ranges.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an image wise pattern onto a recording substrate. A direct printing process is also disclosed in, for example, U.S. Pat. No. 5,195, 430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an image wise pattern onto an intermediate transfer member, and transferring the ink in the image wise pattern from the intermediate transfer member to a final recording substrate. In a specific embodiment, the intermediate transfer member is heated to a temperature above that of the final recording sheet and below that of the melted ink in the printing apparatus. In a specific embodiment, the intermediate transfer member is maintained at a temperature that enables ink printed thereon to form a gel phase prior to forming a solid phase. In one embodiment, the intermediate transfer member is heated to a temperature of from about 4° C. above to about 60° C. below the ink melting temperature, and in another embodiment, the intermediate transfer member is heated to a temperature of from about 2° C. above to about 50° C. below the ink melting temperature, although the temperature of the intermediate transfer member can be outside of these ranges. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in an image wise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

Specific embodiments will now be described in detail. These examples are intended to be illustrative, and the claims are not limited to the materials, conditions, or process parameters set forth in these embodiments.

A number of carbon black inks are formulated with gellant (Examples I, II, III and IV) and without gellants (and V) and by two different processes, the first one (Examples I, III, IV, V, and VI) using the process of this invention produces inks that are both filtered and jetted reliably, the second process, in which all ink components are mixed into one beaker, produce an ink that have poor filterability and jetting properties. The results below show that the carbon black inks containing gellants are as stable or more stable that the inks containing no gellant, if the process of this invention is used to formulate the inks. The latitude of the process of this invention is also demonstrated for two different carbon blacks and two different dispersants.

EXAMPLE I

Melt and stir-mix 71.2 g of a tetra-amide resin, obtained from the reaction of one equivalent of dimer acid with two equivalents of ethylene diamine and Unicid 700 (obtained from Baker Petrolite, Tulsa, Okla.),—prepared as in Example 1 of U.S. Pat. No. 6,174,937, the disclosure of which is totally incorporated herein by reference, 120.0 g of OLOA 11000 from Chevron Chemical, 70.0 g of Nipex 150 from Degussa Chemicals, 400 g of a mono-amide, Kemamide S180, from Crompton Corp., 101.4 g of KE100 resin, triglycerides of hydrogenated abietic (rosin) acid, from Arakawa Chemical Industries, Ltd and 2.4 g of Naugard N445, from Crompton Corp., in a 4 L beaker (A) at 125° C. The beaker (A) is equipped with a heating mantel and a mechanical stirrer. Heat and stir the resulting carbon black dispersion for one hour at 125° C. While the carbon black dispersion in beaker (A) is being heated and stirred, melt-mix 719 g of Polywax 500 from Baker Petrolite, pre-filtered through a 0.45 micron glass fiber filter at a temperature of 110° C., 446.0 g of Unilin 425, from Baker Petrolite and 70.0 g of Uniclear 100, from Arizona Chemicals, in a 2 L beaker (B) at 125° C. The beaker (B) is equipped with a heating mantel and a mechanical stirrer. Heat and stir the resulting resin dispersion in beaker (B) for an hour to make sure that all resins in beaker (B) is fully melt-mixed.

An IKA Ultra Turrax T50 Homogenizer is then used to homogenize the ingredients in beaker (A) for 30 minutes with temperature maintained at 125° C. during homogenization. The molten resin mixture in beaker (B), which is kept at 125° C. is then added to the homogenized pigment dispersion in beaker (A). Further homogenize the resulting carbon black dispersion mixture in beaker (A) for another 30 minutes. After filtering the resulting carbon black ink subsequently through a 1 micron and then a 0.45 micron glass fiber cartridge-filter at 120° C., the ink is cooled to room temperature. The resulting ink is then evaluated for ink jet applications.

With the ink viscosity maintained at a fixed viscosity, preferably around 10.6 cps at about 110° C., a 100 g sample of the ink is sampled and aged inside an oven at 110° C. for 48 hours. The aged ink is then filtered through a 47 mm 0.45 micron glass fiber disc filter at 110° C. at 15 psi. The ink in Example I after aging filters through the 0.45 micron filter in about 4.0 minutes. The ink images well on a modified Xerox Phaser 8400 printer with the jetting temperature being set at about 110° C.

EXAMPLE II

The same materials are used in Example I but all ink components are melt-mixed in beaker (A).

Melt and stir-mixed 71.2 g of a tetra-amide resin, obtained from the reaction of one equivalent of dimer acid with two equivalents of ethylene diamine and Unicid 700 (obtained from Baker Petrolite, Tulsa, Okla.), prepared as in Example 1 of U.S. Pat. No. 6,174,937, the disclosure of which is totally incorporated herein by reference, 120.0 g of OLOA 11000 from Chevron Chemical and 70.0 g of Nipex 150 from Degussa Chemicals, 400 g of a mono-amide, Kemamide S180, from Crompton Corp, 101.4 g of KE100 resin, triglycerides of hydrogenated abietic (rosin) acid, from Arakawa Chemical Industries, Ltd and 2.4 g of Naugard N445, from Crompton Corp., 719 g of Polywax 500 from Baker Petrolite, pre-filtered through a 0.45 micron glass fiber filter at a temperature of 110 degrees C., 446.0 g of Unilin 425, from Baker Petrolite and 70.0 g of Uniclear 100, from Arizona Chemicals, in a 4 L beaker (A) at 125 degrees C. The beaker (A) is equipped with a heating mantel and a mechanical stirrer. Heat and stir the resulting carbon black dispersion for an hour at 125° C.

An IKA Ultra Turrax T50 Homogenizer is then used to homogenize the ingredients in beaker (A) for 60-90 minutes with the temperature maintained at 125° C. during homogenization. After filtering the resulting carbon black ink subsequently through a 1 micron and then a 0.45 micron glass fiber cartridge-filter at 120° C., the ink is then cooled to room temperature. The resulting filtered ink is then evaluated for ink jet applications. With the ink viscosity maintained at a fixed viscosity, preferably around 10.6 cps, a 100 g sample of the ink is aged inside an oven at 110° C. for 48 hours. The aged ink is then filtered through a 47 mm 0.45 micron glass fiber disc filter at 110° C. at 15 psi. The ink of Example II after aging, filters through the 0.45 micron filter in more than 10 minutes. Not all of the ink can be filtered through the filter. The ink has difficulty jetting and does not image well on a modified Xerox Phaser 8400 printer with the jetting temperature being set at about 110° C.

EXAMPLE III

The same materials are used as Example I, but increase the amount of KE100 in the ink formulations.

Melt and stir-mix 67.85 g of a tetra-amide resin, obtained from the reaction of one equivalent of dimer acid with two equivalents of ethylene diamine and Unicid 700 (obtained from Baker Petrolite, Tulsa, Okla.), prepared as in Example 1 of U.S. Pat. No. 6,174,937, the disclosure of which is totally incorporated herein by reference, 114.36 g of OLOA 11000 from Chevron Chemical, 66.71 g of Nipex 150 from Degussa Chemicals, 381.21 g of a mono-amide, Kemamide S180, from Crompton Corp, 190.6 g of KE100 resin, triglycerides of hydrogenated abietic (rosin) acid, from Arakawa Chemical Industries, Ltd and 2.29 g of Naugard N445, from Crompton Corp., in a 4 L beaker (A) at 125° C. The beaker (A) is equipped with a heating mantel and a mechanical stirrer. Heat and stir the resulting carbon black dispersion for an hour at 125° C. While the carbon black pigment dispersion in beaker (A) is being heated and stirred, melt-mix 685.22 g of Polywax 500 from Baker Petrolite, pre-filtered through a 0.45 micron glass fiber filter at a temperature of 110° C., 425.05 g of Unilin 425, from Baker Pertolite and 66.71 g of Uniclear 100, from Arizona Chemicals, in a 2 L beaker (B) at 125° C. The beaker (B) is equipped with a heating mantel and a mechanical stirrer. Heat and stir the resulting resin dispersion in beaker (B) for an hour to make sure that all resins in Beaker (B) are fully melt-mixed.

An IKA Ultra Turrax T50 Homogenizer is then used to homogenize the ingredients in beaker (A) for 30 minutes with the temperature maintained at 125° C. during homogenization. The molten resin mixture in beaker (B), which is kept at 125° C. is then added into the homogenized pigment dispersion in beaker (A). Further homogenize the resulting carbon black dispersion mixture in beaker (A) for another 30 minutes. After filtering the resulting carbon black ink subsequently through a 1 micron and then a 0.45 micron glass fiber cartridge-filter at 120° C., the ink is cooled to room temperature. The resulting ink is then evaluated for ink jet applications.

With the ink viscosity maintained at a fixed viscosity, preferably around 10.6 cps at about 110° C., a 100 g sample of the ink is aged inside an oven at 110° C. for 48 hours. The aged ink is then filtered through a 47 mm 0.45 micron glass fiber disc filter at 110° C. at 15 psi. The ink in Example III after aging, filters through the 0.45 micron filter in about 3.0 minutes. The ink images well on a modified Xerox Phaser 8400 printer with the jetting temperature being set at about 110° C.

EXAMPLE IV

Using the same formulations and preparation procedures as ink I, but replace the Nipex 150 with Special Black 4, from Degussa Chemicals.

The ink in example IV after aging, filters through the 0.45 micron filter in about 3.0 minutes. The ink images well on a modified Xerox Phaser 8400 printer with the jetting temperature being set at about 110° C.

EXAMPLE V

A Tetra-amide resin, obtained from the reaction of one equivalent of dimer acid with two equivalents of ethylene diamine and Unicid 700 (obtained from Baker Petrolite, Tulsa, Okla.) is prepared as in Example 1 of U.S. Pat. No. 6,174,937. The resin originally in the form of chips or chunks is processed through a blender to yield a tetra-amide powder. Thereafter, 750.72 g of the powderized tetra-amide resin and 239.7 g of Nipex 150 carbon black (obtained from Degussa Canada, Burlington, Ontario) are admixed in a LITTLE-FORD M5 blender for 30 minutes at 0.8 A. Subsequently, the powder mixture is added at a rate of 0.8 lbs/hr to a DAVO counter-rotating twin screw extruder (Model VS 104, from Deutsche Apparate-Vertrieborganisation GmbH & Co, Troisdorf, Germany). The contents in the extruder are then mixed at 70° C. at 50 RPM. The outlet temperature is set at 75° C. This yields a carbon black dispersion, Extrudate A.

Melt and stir-mix 372.19 g of Extrudate A, prepared as described above, 56.40 g of Ircosperse 2155 from Lubrizol Chemical and 370.09 g of a mono-amide, Kemamide S180, from Crompton Corp., 211.48 g of KE100 resin, triglycerides of hydrogenated abietic (rosin) acid, from Arakawa Chemical Industries, Ltd and 3.6 g of Naugard N445, from Crompton Corp., in a 4 L beaker (A) at 125° C. The beaker (A) was equipped with a heating mantel and a mechanical stirrer. Heat and stir the resulting carbon black dispersion for an hour at 125° C. While the carbon black pigment dispersion in beaker (A) is being heated and stirred, melt-mix 898.13 g of Polywax 500 from Baker Petrolite, pre-filtered through a 0.45 micron glass fiber cartridge-filter at a temperature of 110° C., 88.11 g of the urethane resin described in example 4 of U.S. Pat. No. 6,309,453 B1, in a 2 L beaker (B) at 125° C. The beaker (B) is equipped with a heating mantel and a mechanical stirrer. Heat and stir the resulting resin dispersion in beaker (B) for an hour to make sure that all resins in Beaker (B) are fully melt-mixed.

An IKA Ultra Turrax T50 Homogenizer is then used to homogenize the ingredients in beaker (A) for 30 minutes with the temperature maintained at 125° C. during homogenization. The molten resin mixture in beaker (B), which is kept at 125° C. is then added into the homogenized pigment dispersion in beaker (A). Further homogenize the resulting carbon black dispersion mixture in beaker (A) for another 30 minutes. After filtering the resulting carbon black ink subsequently through a 1 micron and then a 0.45 micron glass fiber cartridge-filter at 120° C., the ink is cooled to room temperature. The resulting ink is then evaluated for ink jet applications.

With the ink viscosity maintained at a fixed viscosity, preferably around 10.6 cps at about 110° C., a 100 g sample of the ink is aged inside an oven at 110° C. for 48 hours. The aged ink is then filtered through a 47 mm 0.45 micron glass fiber disc filter at 110° C. at 15 psi. The ink in Example V after aging, filters through the 0.45 micron filter in about 3.0 minutes. The ink images well on a modified Xerox Phaser 8400 printer with the jetting temperature being set at about 110° C.

The invention claimed is:

1. A carbon black phase change ink composition comprising (1) a low polarity ink carrier comprising (A) a low polarity wax, (2) a dispersant, (3) a gellant comprising an ester-terminated amide which is present in the low polarity ink carrier in an amount equal to or less than about 20% by weight, and (4) a carbon black colorant, said ink being resistant to substantial aggregation and settling of the carbon black colorant in the melt up to about the jetting temperature of the ink even when exposed to freeze thaw cycles.

2. A phase change ink according to claim 1, which comprises a low energy phase change ink which exhibits at least one of a substantially low jetting temperature of less than about 135.degree. C., a substantially low standby temperature of less than about 105.degree. C., and a substantially low intermediate substrate (drum) temperature of less than about 65.degree. C.

3. A phase change ink according to claim 1, wherein the low polarity wax is present in the low polarity ink carrier in an amount of from about 25% and equal to or less than about 65% by weight.

4. A phase change ink according to claim 1, which has a gel transition range of between about 3 to about 55.degree. C. and a plateau-like viscosity, in the transition region, of at least about 100 cps.

5. A phase change ink according to claim 4, where the standby-mode printer temperature for the ink is at or below the gel transition region.

6. A phase change ink according to claim 1, wherein the dispersant is a polyalkylene succinimide of the formula

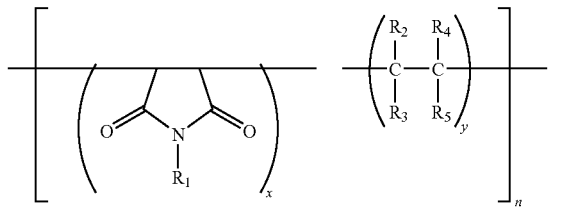

wherein x is an integer representing the number of repeating succinimide units, y is an integer representing the number of repeating alkylene units, n is an integer representing the number of repeating units, R.sub.1 is an alkyl group, an aryl group, an arylalkyl group, or an alkylaryl group, and R.sub.2, R.sub.3, R.sub.4, and R.sub.5 each, independently of the others, is a hydrogen atom or an alkyl group.

7. A phase change ink according to claim 1, wherein said low polarity wax comprises a polyalkylene wax and/or a hydroxy terminated alcohol wax and/or a mono-amide wax.

8. A method for producing a carbon black phase change ink composition comprising combining (1) a low polarity ink carrier comprising (A) an ester-terminated polyamide which is present in the low polarity ink carrier in an amount equal to or less than about 20% by weight, and (B) a low polarity wax, (2) a dispersant, and (3) a carbon black colorant, said ink being resistant to substantial aggregation and settling of the carbon black colorant in the melt and up to about the jetting temperature of the ink as well as when exposed to freeze thaw cycles.

9. A method according to claim 8, wherein said ink comprises a low energy phase change ink which exhibits at least one of a substantially low jetting temperature of less than about 135.degree. C., a substantially low standby temperature of less than about 105.degree. C., and a substantially low intermediate substrate (drum) temperature of less than about 65.degree. C.

10. A method according to claim 8, wherein the low polarity wax is present in the low polarity ink carrier in an amount of from about 25% up to about 65% by weight.

11. A method according to claim 8, wherein the phase change ink has a melting transition range of between about 3.degree. C. to about 55.degree. C. and a plateau-like viscosity, in the gel transition region, of at least about 100 cps.

12. A method according to claim 8, where the standby-mode printer temperature for the ink is at or below the gel transition of the ink.

13. A method according to claim 8, wherein the dispersant is a polyalkylene succinimide of the formula

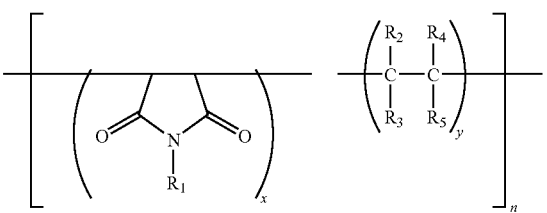

wherein x is an integer representing the number of repeating succinimide units, y is an integer representing the number of repeating alkylene units, n is an integer representing the number of repeating units, R.sub. 1 is an alkyl group, an aryl group, an arylalkyl group, or an alkylaryl group, and R.sub.2, R.sub.3, R.sub.4, and R.sub.5 each, independently of the others, is a hydrogen atom or an alkyl group.

14. A method according to claim 8, wherein said low polarity wax comprises a polyalkylene wax and/or a hydroxy terminated alcohol wax and/or a mono-amide wax.

15. A method according to claim 14, wherein the polyalkylene wax is filtered through a submicron filter.

16. A method which comprises (a) incorporating into an ink jet printing apparatus a low energy phase change ink composition comprising (1) a low polarity ink carrier comprising (A) a low polarity wax, (2) a dispersant, (3) a gellant comprising an ester-terminated amide which is present in the low polarity ink carrier in an amount equal to or less than about 20% by weight, and (4) a carbon black colorant; melting the low energy phase change ink composition; and (c) causing droplets of the melted ink to be ejected at a temperature in an image wise pattern onto a substrate.

17. A method according to claim 16, which further includes a transfix step.

18. A method according to claim 16, which further comprises post-fusing of the image wise pattern with the application of heat.

19. A method according to claim 16, which further comprises post-fusing of the image wise pattern with the application of heat and pressure.

20. A method according to claim 16, wherein the substrate is a final recording sheet and droplets of the melted ink are ejected in an image wise pattern directly onto the final recording sheet.

21. A method according to claim 16, wherein the substrate is an intermediate transfer member and droplets of the melted ink are ejected in an image wise pattern onto the intermediate transfer member followed by transfer of the image wise pattern from the intermediate transfer member to a final recording sheet.

22. A method according to claim 21, wherein the intermediate transfer member is heated to a temperature above that of the final recording sheet and below that of the melted ink in the printing apparatus.

23. A process for preparing the ink of claim 1 which comprises 1) dispersing the carbon black with the dispersant, and optionally said gellant, in the ink vehicle in absence of at least one of the low polarity ink component, and 2) adding the remaining low polarity ink component(s) individually or as a blend to the molten carbon black dispersion, and 3) filtering the resulting dispersion subsequently through a 1 micron and then a 0.45 micron glass fiber cartridge-filter at a temperature ranging from about 120 to 130.degree. C.

24. A process according to claim 23 which comprises pre-filtering the low polarity component (s) or blend(s) through a sub-micron micron filter, preferably equal or less than 0.45 micron, at a temperature that is maintained above the onset of crystallization up to about 140.degree. C.

* * * * *